United States Patent [19]

Moggi et al.

[11] Patent Number: 4,985,282

[45] Date of Patent: Jan. 15, 1991

[54] PROCESS FOR PROTECTING AND CONSOLIDATING STONY MATERIALS

[75] Inventors: Giovanni Moggi; Desiderata Ingoglia, both of Milan; Daria Lenti, Valenza, all of Italy

[73] Assignee: Ausimont S.r.l., Milan, Italy

[21] Appl. No.: 451,948

[22] Filed: Dec. 18, 1989

[30] Foreign Application Priority Data

Dec. 19, 1988 [IT] Italy .................. 23003 A/88

[51] Int. Cl.$^5$ .............................................. B65D 3/02
[52] U.S. Cl. .................. 427/393; 427/393.6; 428/422; 428/540; 428/541
[58] Field of Search ............... 427/393, 393.6; 428/422, 540, 541

[56] References Cited

U.S. PATENT DOCUMENTS 4,746,550  5/1988  Strepparola et al. ........ 427/393.6 X
4,764,431  8/1988  Piacenti et al. .............. 427/393.6 X Primary Examiner—Michael Lusignan
Attorney, Agent, or Firm—Stevens, Davis, Miller & Mosher

[57] ABSTRACT

The surfaces of stony materials, tiles, cement conglomerates and relevant manufactured articles are protected from atmospheric agents and pollutants by surface application of a protective material consisting of a mixture comprising a vinylidene fluoride polymer or copolymer containing 55–100 mol % of vinylidene fluoride, 0–45 mole % of hexafluoropropene and 0–30 mol % of tetrafluoroethylene and an aqueous microemulsion or emulsion of perfluoropolyethers. Such mixtures are applied by conventional methods onto the surface to be protected.

4 Claims, No Drawings

PROCESS FOR PROTECTING AND CONSOLIDATING STONY MATERIALS

FIELD OF THE INVENTION

The present invention relates to a process for consolidating and protecting stony materials, tiles, cement conglomerates and articles manufactured therefrom, which are exposed to degrading action caused by atmospheric agents and pollutants.

BACKGROUND OF THE INVENTION

As is known, the decay of the building materials, in particular, marble, sandstones, tiles, and of the artistic and decorative articles manufactured from such materials, is caused by two different kinds of phenomena: chemical phenomena and physical phenomena, both occurring in the presence of water.

A physical phenomenon, which acts on all the building materials in the one which is caused by succession of frost and thaw of water absorbed into the material pores. This leads to variation of specific volume and to tension, which often cause fractures and/or loss of cohesion or in any case a separation among the individual particles forming the material.

Another physical phenomenon is the dissolution process in water of limestone, which is contained as an essential component in the marbles and as a binder in the stones, with consequent loss of cohesion of the granules.

Equally important for the decay of the materials and manufactured articles exposed to the open atmosphere is the aggregate of chemical phenomena. This phenomena substantially consists in the aggression of the carbonated parts of the material or of the manufactured article by the pollutants which are present in the air (for example carbon dioxide, sulphur dioxide, nitrogen oxide). The pollutants react with the material in the presence of water. Their concentration is particularly high when rain begins.

It is known that to eliminate or at least to sensibly reduce the above-mentioned drawbacks, it is necessary to remarkably reduce the penetration rate of water inside the material to be protected.

To achieve this object, chemical compounds, which can possess a twofold property, i.e., the hydrophobic and consolidating property, are usually applied onto the outer surface of the material to be protected.

To exert the desired action and not to cause, at the same time, collateral decay phenomena or undesired side effects, the consolidating/protective compound must possess the following essential characteristics:

1 Restoring ability of the cohesion between the particles of the outermost layer of the decayed material and the underlying integral part.

2. Exhibiting an adequate mechanical strength of the so consolidated outermost layer.

3. Retaining, in the consolidated outermost layer, characteristics of elasticity to prevent the formation, as occurs with other products, of a stiff surface layer having mechanical characteristics which are different from those of the substrate.

4. Chemical inertia towards the material to be protected/consolidated.

5. Low volatility.

6. Stability to the action of atmospheric agents, to sunlight and to heat.

7. Not altering the material chromaticity.

8. Retaining for a long time its own solubility characteristics to secure treatment reversibility.

As is known, for the consolidation and protection of stony material, film-forming substances, such as glues, drying oils, resins and polymeric matters are often used. References on the use of such substances are contained in the book by *Amoroso and Fassina* "Stone Decay and Conservation", Elsewier Ed., Amsterdam (1983).

Among such substances, which are all not thoroughly satisfactory for the above purposes, the most commonly used are the following: polyethylene glycols and their methylethers, which exhibit, however, a high solubility in water, wherefore the use thereof must be limited to the protection of articles not exposed to the environment; polyvinyl acetate and polyvinyl alcohol, which exhibit the drawback of being sensible to water, in which the former, moreover, hydrolyzes thereby releasing acetic acid; polymethylmethacrylate and acrylic resins in general, which, however, tend to yellow in the course of time and are not capable of providing a complete protection from $SO_2$ contained in the atmosphere, while the thermosetting acrylic copolymer, endowed with better characteristics, exhibits the drawback of being irreversible; silicone resins, which, however, besides the possibility of releasing methanol, are affected by the drawback of cross-linking with formation of a product, which cannot be removed; epoxy reins, which tend to yellow and, because of their having the structure of thermosetting resins, make it difficult or impossible to carry out reversible treatments; polyester resins, which have the drawback of being sensible to water (owing to which they tend to saponify) and also of cross-linking, wherefore they lose the reversibility characteristic.

Such products, which are utilized in the treatment of the stony and cement articles, besides not exhibiting in general, as explained above, characteristics of stability to chemical and physical attacks, drastically reduce the permeability of the treated surface to air and to water vapor. As a consequence thereof, extremely remarked alteration phenomena occur in the manufactured articles when exposed to the environment underneath the impermeable film, owing to condensation water inside the materials.

The use, for the above purposes, of perfluoropolyethers applied in the form of solution is chlorofluorocarbons, as is described in European patent application Nos. 59,100 and 192,493, or in the form of aqueous microemulsions, as is described in European patent application No. 89/106,150, has solved the problem concerning the protection. However such compounds, because they are liquids, cannot exert any consolidating action.

The use of vinylidene fluoride copolymers as is described in European patent application No. 192,494 has solved the problem concerning the consolidation, but it involves the use of considerable amounts of inflammable solvent.

The above references are hereby incorporated by reference.

DETAILED DESCRIPTION OF THE INVENTION

The applicant has now found a method of consolidating and protecting stony materials, marbles, sandstone, tiles, cement conglomerates and articles manufactured from such materials, from the degrading action of the polluting and atmospheric agents, which method is free from the drawbacks exhibited by the above-mentioned methods. The method, which is the object of the present invention, consists in the use, as a protecting material, of an aqueous mixture obtained from:

(a) an aqueous dispersion of a vinylidene fluoride homopolymer or copolymer comprising from 55 to 100 mole % and preferably up to 80 mole % of vinylidene fluoride, from 0 to 30 mole % of tetrafluoroethylene and from 0 to 45 mole % of hexafluoropropene, and (b) an aqueous emulsion or microemulsion of a perfluoropolyether consisting of sequences of fluorooxyalkylene units selected from:

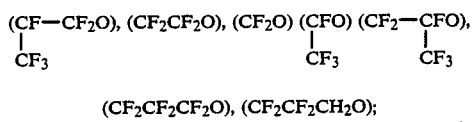

$(CF_2CF_2CF_2O)$, $(CF_2CF_2CH_2O)$;

and having perfluoroalkyl and/or functional end groups.

The aqueous mixture obtained from (a)+(b) contains a vinylidene fluoride (co)polymer and the perfluoropolyether for a total amount generally ranging from 2% to 40% and preferably ranging from 15% to 40% by weight on the total. The weight ratio between the $CH_2=CF_2$ (co)polymer and perfluoropolyether, in the aqueous mixture, generally ranges from 20:1 to 1:20, more usually ranges from 10:1 to 1:10, and preferably from 5:1 to 1:5.

"Perfluoropolyether functional group" means a group which is capable of forming a chemical and/or physical bond with the material to be protected, and is selected from the ones which are capable of forming coordinative bonds and charge transfer bonds with the material. Preferred functional groups are: —COOH, —CH$_2$OH, polyoxyalkylene—OH, —C(OH)$_2$—CF$_3$, —CONR$^2$R$^3$, CONHR$^9$, —CONH$_2$, —COOR$^4$, and quaternarized ammonium groups, wherein R$^2$ and R$^3$, equal or different from each other, are alkyl groups, usually containing 1 to 8 carbon atoms; R$^4$ represents an alkyl group, usually containing 1 to 8 carbon atoms or an aromatic alkyl-aromatic group, such as a benzyl group, and R$^9$ represents an alkyl group, usually containing from 1 to 8 carbon atoms. The end group —COOH is preferably salified.

The quaternarized ammonium group is particularly represented by a —COONR$^5$R$^6$R$^7$R$^8$ group, wherein R$^5$, R$^6$, R$^7$, and R$^8$ represent alkyl groups, usually containing from 4 to 32 carbon atoms in the aggregate. As starting products, it is possible to utilize also perfluoropolyethers with —COCF$_3$, —COF or —SO$_2$F end groups, which during the preparation of the microemulsion hydrolyze to —C(OH)$_2$—CF$_3$, —COOH and —SO$_3$H groups, and are then salified. The average molecular weight of the perfluoropolyethereal chain ranges from 1,000 to 10,000, preferably from 2,000 to 6,000.

The perfluoropolyethers utilized in the present invention may contain, besides the above functional groups, also perfluoroalkyl end groups.

The perfluoropolyethers utilized in the present invention may be, in particular, the ones belonging to the following classes:

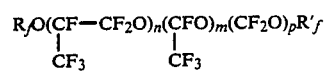

having a random distribution of the perfluorooxyalkylene units, wherein m, n, p have such average values to meet the above characteristics regarding the average molecular weight;

2. R$_f$O(CF$_2$CF$_2$O)$_n$(CF$_2$O)$_m$R$'_f$, with a random distribution of the perfluorooxyalkylene units, wherein n and m have such average values to meet the above characteristics;

3.

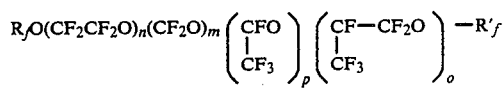

wherein m, n, p, o have such average values to meet the above characteristics;

4.

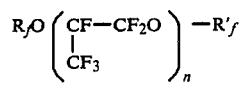

wherein n has such an average value as to meet above chacteristics;

5. R$_f$O(CF$_2$CF$_2$O)$_n$R$'_f$, wherein n has such an average value to meet the above chacteristics;

6. R$_f$O(CF$_2$CF$_2$CF$_2$O)$_n$R$'_f$ or R$_f$O(CH$_2$CF$_2$C-F$_2$O)$_n$R$'_f$, wherein n has such a value to meet the above chacteristics.

R$_f$ and R$'_f$ in formulas 1 to 6 are perfluoroalkyls having 1 to 3 carbon atoms or end groups containing functional groups of the type defined hereinbefore.

As is known, the functional end groups of functionalized perfluoropolyethers are bound to the perfluoropolyether chain by a divalent linking group, particularly by a

group, wherein X=F or CF$_3$.

Other divalent linking groups or radicals are shown in U.S. Pat. No. 4,094,911, hereby incorporated by reference.

Perfluoropolyethers of class 1 are commercially known under the trademark Fomblin ®Y, the ones of class 2 under the trademark Fomblin ®Z, all of them being produced by Montedison. Products of class 4, which are commercially known, are Krytox ® (Du Pont).

The products of class 5 are described in U.S. Pat. No. 4,523,039; the ones of class 6 are described in European Pat. No. 148,482 to DAIKIN, all hereby incorporated by reference. The products of class 3 are prepared according to U.S. Pat. No. 3,665,041, hereby incorporated by reference. Useful products are also the perfluoropolyethers described in U.S. Pat. No. 4,523,039 or in J. Am. Chem. Soc., 107, 1195-1201 (1985), all hereby incorporated by reference.

The products of classes 1, 2, and 3, which are obtained through photochemical oxidation processes, are utilizable as rough products of the photooxidation process, which contain peroxy groups —OO— in the chain and are inserted between the perfluorooxyalkylene units.

Perfluoropolyethers which are suitable for the use according to the invention are also the ones described in European patent application No. 244,839, (incorporated by reference), comprising functional groups of the type described hereinbefore, arranged along the chain, and functional or perfluoroalkyl end groups.

In the preparation of the aqueous mixture according to the present invention, it is particularly advantageous to use the perfluoropolyether in the form of an aqueous microemulsion.

The microemulsions to be used in the present invention are preparable according to the method described in European patent application No. 250,766, hereby incorporated by reference. An essential ingredient is an ionic or nonionic fluorinated surfactant, and/or a surfactant compound chosen between a hydrogenated alcohol, containing 1 to 12 carbon atoms, preferably 1 to 6 carbon atoms, and a fluoroalkanol compound.

In particular, the following can be cited as fluorinated surfactant compounds of ionic or nonionic type:

(a) perfluorocarboxylic acids containing 5–11 carbon atoms, and salts thereof;

(b) perfluorosulphonic acids having 5–11 carbon atoms, and salts thereof;

(c) the nonionic surfactants indicated in European patent application No. 51,526, (incorporated by reference) consisting of a perfluoroalkyl chain and of a polyoxyalkylene hydrophilic head;

(d) mono- and di-carboxylic acids deriving from perfluoropolyethers, and salts thereof;

(e) nonionic surfactants consisting of a perfluoropolyethereal chain bound to a polyoxyalkylene chain;

(f) perfluorinated cationic surfactants or derived from perfluoropolyethers having 1, 2, or 3 hydrophobic chains.

The amount of protective agent (perfluoropolyether plus homo- or co-polymer) to be used varies as a function of the nature of the material to be treated, in particular, as a function of its porosity. The amount of agent generally ranges from 4 g/m², for low-porosity materials to be treated, to 200 g/m² for high-porosity materials and, more usually, from 7 to 100 g/m².

The vinylidene fluoride homopolymers and its co-polymers with the above monomers are known in the art as they are described, inter alia, for example, in British Pat No. 888,765 and in Kirk Othmer "Encyclopedia of Chemical Technology" vol. 11, p. 64 (1980); Polymer Bulletin, vol. 11, p. 35 (1984); J. of Polymer Sci.-Polymer Physics Edition, vol. 22, p. 357 (1984), all hereby incorporated by reference.

The fluoropolymer aqueous dispersion can be directly prepared by polymerization, as is described in Kirk Othmer (vol. 8, p. 500) (incorporated by reference) operating in the presence of a surfactant. The latex can be then stabilized with stabilizers of polymeric latexes such as, for example, TRITON X 100.

The protective aqueous mixture, to be used according to the present invention, obtained by mixing the above ingredients (a) and (b), permits obtaining at the same time and with only one protective product, the consolidating effect caused by the $CH_2=CF_2$ copolymer, and the protective effect against the atmospheric agents, evidenced by the low water absorption of the treated building material, caused by the perfluoropolyether.

Another substantial advantage is that both the above protective agents are used in the form of aqueous dispersions, which avoids the use of organic solvents.

The aqueous mixture is applied onto the surface of the material to be treated by any usual techniques, for example, by brushing, spraying, or immersion methods. The amount of product which is applied per surface unit of the material to be consolidated/protected, is a function of the physical characteristics of the surface, such as e.g. porosity and disaggregation state of the material. The greater the porosity and disaggregation state, the greater shall be the amount of protective/consolidating mixture to be applied, and the polymer/perfluoropolyether ratio.

EXAMPLES

The invention is illustrated by the following examples, which are given for merely illustrative and not limitative purposes.

Utilized Products

A. VDF/TFE/PFP terpolymer (molar ratio: 65/15/20) in the form of an aqueous dispersion, prepared by polymerization in the presence of ammonium persulphate according to what is described in the reference Kirk Othmer etc., and stabilized with 2% of TRITON X 100. The aqueous dispersion contains 30% by weight of terpolymer.

B. Microemulsion, prepared according to European patent application No. 89/106,150 (example 5), having the following composition:

| composition: | |
|---|---|
| rough perfluoropolyether (PFPE) | 21.3% |
| fluorinated surfactants | 14.6% |
| aqueous phase | 64.1% |

C. Microemulsion, prepared in like manner as the preceding one, but having the following composition:

| | |
|---|---|
| rough perfluoropolyether (PFPE) | 28.1% |
| fluorinated surfactants | 9.6% |
| isopropanol | 16.1% |
| aqueous phase | 46.2% |

D. MIX 1: a mix of B. and A. such that the weight ratio between terpolymer and PFPE is 21/100.

E. MIX 2: a mix of B. and A., but such that the weight ratio between terpolymer and PFPE is 43/100.

F. MIX 3: a mix of B. and A., but such that the weight ratio between terpolymer and PFPE is 100/11.

G. MIX 4: a mix of C. and A. such that the weight ratio between terpolymer and PFPE is 233/100.

Tests

The protection effectiveness is evaluated according to the pipette method described in European Pat. No. 59,100.

The aggregation effectiveness or consolidating power is measured according to the method described in European Pat. No. 192,494.

Utilized Materials

Vicenza Stone: biocalcarenite having a porosity equal to about 30%;
Siena Brick: having a porosity equal to about 40%;
Lecce Stone: calcareous rock, of the biocalcarenites group, having a porosity equal to about 35%.

EXAMPLE 1 (TABLE 1)

5 specimens (sizes: 5×5×5 cm) of Vicenza Stone were utilized. One of them was not protected. While on the others, the products indicated in the table were applied by brushing.

From a comparison between tests 3 and 5 (reference tests), on one side, and tests 2 and 4, on the other side, it is apparent that the presence of the terpolymer remarkably improves the protection degree. The total product content is equal.

EXAMPLE 2 (TABLE 2)

5 specimens as above were treated, but the products utilized were different. Specimen 1 was not treated.

From a comparison between tests 3 and 5 (reference tests) and tests 2 and 4, it is apparent that the presence of PFPE sensibly improves the protection degree. The total product content is equal.

EXAMPLE 3 (TABLE 3)

4 specimens (2, 3, 4, and 5) of Vicenza Stone were treated with different amounts of MIX 1. Specimen 1, not treated, was used as a check.

The reported tests show that the protective effectiveness increases as the total amount of applied product increases, as expected.

EXAMPLE 4 (TABLE 4)

4 specimens (2, 3, 4, and 5) of Vicenza Stone were treated with different amounts of MIX 2. Specimen 1, not treated, was used as a check.

The reported tests show that the protective effectiveness increases as the total amount of applied product increases, as expected.

EXAMPLE 5 (TABLE 5)

2 specimens (2 and 3) of Siena Brick were treated. One of them was treated with microemulsion B. and the other with MIX 3 (mix of B. and of terpolymer A.). Specimen 1 was not treated.

From a comparison between test 2 (reference test) and test 3, it is apparent that the presence of terpolymer remarkably improves the protection degree. The total product amount is equal.

EXAMPLE 6 (TABLE 6)

The weight loss of 6 specimens (sizes: 5×5×5 cm) of Lecce Stone, artificially aged by 300 frosting and defrosting[1] cycles, was measured; specimen 1 was not treated, while the other specimens were treated with terpolymer A., with MIX 4 in two different amounts and with microemulsion C.

[1] As described in Acta of the Meeting "Manutenzione e conservazione del costruito"—Bressanone (Italy) pp. 527–541 (1986).

A comparison between test 4 (reference test) and test 2 evidenced the aggregating effect attributable to the combination of PFPE and terpolymer.

A comparison between test 2 and tests 5 and 6 proves that the sum of the effects of the two individual components (PFPE and terpolymer) is lesser than the effect of same when mixed with each other.

TABLE 1

| test number | treated material | protective and aggregating agents | total amount of applied product (g/m²) | amount of applied PFPE (g/m²) | amount of applied terpolymer (g/m²) | amount of absorbed water (g/m²) | treatment effectiveness (protection) (%) |
|---|---|---|---|---|---|---|---|
| 1 | VICENZA STONE | — | — | — | — | 1.095 | — |
| 2 | VICENZA STONE | MIX 1 | 60 | 49.6 | 10.4 | 0.230 | 79 |
| 3 | | MICROEM. B | 60 | 60 | — | 0.536 | 51 |
| 4 | VICENZA | MIX 1 | 90 | 74.4 | 15.6 | 0.164 | 85 |
| 5 | STONE | MICROEM. B | 90 | 90 | — | 0.317 | 71 |

TABLE 2

| test number | treated material | protective and aggregating agents | total amount of applied product (g/m²) | amount of applied PFPE (g/m²) | amount of applied terpolymer (g/m²) | amount of absorbed water (g/m²) | treatment effectiveness (protection) (%) |
|---|---|---|---|---|---|---|---|
| 1 | VICENZA STONE | — | — | — | — | 1.260 | — |
| 2 | VICENZA | MIX 1 | 30 | 24.8 | 5.2 | 0.529 | 58 |
| 3 | STONE | TERPOLYMER DISPERSION A. | 30 | — | 30 | 0.655 | 48 |
| 4 | VICENZA | MIX 3 | 44,4 | 4,4 | 40 | 0.428 | 66 |
| 5 | STONE | TERPOLYMER DISPERSION A. | 44,4 | — | 44,4 | 0.504 | 60 |

TABLE 3

| test number | treated material | protective and aggregating agents | total amount of applied product (g/m$^2$) | amount of applied PFPE (g/m$^2$) | amount of applied terpolymer (g/m$^2$) | amount of absorbed water (g/m$^2$) | treatment effectiveness (protection) (%) |
|---|---|---|---|---|---|---|---|
| 1 | VICENZA STONE | — | — | — | — | 1.155 | — |
| 2 | VICENZA | MIX 1 | 30 | 24.8 | 5.2 | 0.485 | 58 |
| 3 | | MIX 1 | 60 | 49.6 | 10.4 | 0.242 | 79 |
| 4 | STONE | MIX 1 | 90 | 74.4 | 15.6 | 0.173 | 85 |
| 5 | | MIX 1 | 120 | 99.2 | 20.8 | 0.150 | 87 |

TABLE 4

| test number | treated material | protective and aggregating agents | total amount of applied product (g/m$^2$) | amount of applied PFPE (g/m$^2$) | amount of applied terpolymer (g/m$^2$) | amount of absorbed water (g/m$^2$) | treatment effectiveness (protection) (%) |
|---|---|---|---|---|---|---|---|
| 1 | VICENZA STONE | — | — | — | — | 1.222 | — |
| 2 | VICENZA | MIX 2 | 30 | 21 | 9 | 0.599 | 51 |
| 3 | | MIX 2 | 60 | 42 | 18 | 0.318 | 74 |
| 4 | STONE | MIX 2 | 90 | 63 | 27 | 0.122 | 90 |
| 5 | | MIX 2 | 150 | 105 | 45 | 0.110 | 91 |

TABLE 5

| test number | treated material | protective and aggregating agents | total amount of applied product (g/m$^2$) | amount of applied PFPE (g/m$^2$) | amount of applied terpolymer (g/m$^2$) | amount of absorbed water (g/m$^2$) | treatment effectiveness (protection) (%) |
|---|---|---|---|---|---|---|---|
| 1 | SIENA BRICK | — | — | — | — | 2.50 | — |
| 2 | SIENA BRICK | MICROEMULSION B. | 30 | 30 | — | 1.37 | 45 |
| 3 | SIENA BRICK | MIX 3 | 30 | 3 | 27 | 1.07 | 57 |

TABLE 6

| test number | treated material | protective and aggregating agents | total amount of applied product (g/m$^2$) | amount of applied PFPE (g/m$^2$) | amount of applied terpolymer (g/m$^2$) | amount of absorbed water (g/m$^2$) | treatment effectiveness (protection) (%) |
|---|---|---|---|---|---|---|---|
| 1 | LECCE STONE | — | — | — | — | 108 | — |
| 2 | LECCE | MIX 4 | 50 | 15 | 35 | 60 | 44 |
| 3 | | MIX 4 | 100 | 30 | 70 | 40 | 63 |
| 4 | STONE | TERPOLYMER DISPERS. A. | 50 | — | 50 | 67 | 38 |
| 5 | LECCE | MICROEM. C. | 15 | 15 | — | 103 | 5 |
| 6 | STONE | TERPOLYMER DISPERS. A. | 35 | — | 35 | 81 | 25 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process for protecting marble, stones, tiles, cement, gypsum, or wood and other similar materials utilized in particular in the building sector, from the decay action caused by atmospheric agents and pollutants, comprising applying onto said materials a protective agent consisting of a mixture of:

(a) an aqueous dispersion of a vinylidene fluoride homo- or co-polymer comprising, by moles, from 55 to 100% of $CH_2=CF_2$, from 0 to 30% of $C_2F_4$ and from 0 to 45% of $C_3F_6$, and of:

(b) an aqueous emulsion or microemulsion of a perfluoropolyether consisting of sequences of fluorooxyalkylene units selected from the following:

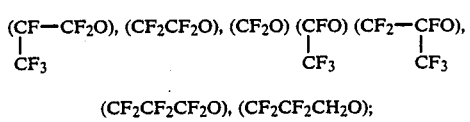

$(CF_2CF_2CF_2O)$, $(CF_2CF_2CH_2O)$;

having an average molecular weight ranging from 1,000 to 10,000 and having perfluoroalkyl end groups and/or end groups containing functional groups capable of forming, with the material to be protected, physical or chemical bonds of the coordinative type or of the charge-transfer type.

2. The process according to claim 1, wherein the perfluoropolyether has functional groups selected from: —COOH, —CH$_2$OH, —polyoxyalkylene—OH, quaternary ammonium groups, —C(OH)$_2$—CF$_3$, —CONR$^2$R$^3$, CONHR$^9$, —CONH$_2$, and —COOR$^4$, wherein R$^2$ and R$^3$, equal or different from each other, represent alkyl groups; R$^4$ represent an alkyl, aromatic or alkyl-aromatic group and R$^9$ represent an alkyl group.

3. The process according to claim 1, wherein a vinylidene fluoride copolymer containing 65 mole % of CH$_2$=CF$_2$, 15 mole % of C$_2$F$_4$ and 20 mole % of C$_3$F$_6$ is used.

4. The process according to claim 1, wherein use is made of a perfluoropolyether comprised in one of the following general formulas:

(a) R$_f$O(CF$_3$-CF$_2$O)$_n$(CF$_3$O)$_m$(CF$_2$O)$_p$R$'_f$
(b) R$_f$O(CF$_2$CF$_2$O)$_n$(CF$_2$O)$_m$R$'_f$
(c) 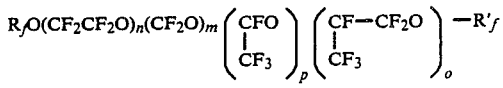

(d) 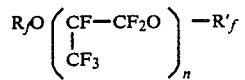

(e) R$_f$O(CF$_2$CF$_2$O)$_n$R$'_f$
(f) R$_f$O(CF$_2$CF$_2$CF$_2$O)$_n$R$'_f$ or R$_f$O(CH$_2$CF$_2$CF$_2$O)$_n$R$'_f$ where indexes n, m, p, o have such values that the molecular weight is in the range indicated in claim 1, R$_f$ and R$'_f$ are perfluoroalkyls with 1 to 3 C or end groups containing functional groups of the type defined in claim 1.

* * * * *